(12) United States Patent
Gupta et al.

(10) Patent No.: US 10,681,140 B2
(45) Date of Patent: Jun. 9, 2020

(54) AUTOMATIC SUBSCRIPTION MANAGEMENT OF COMPUTING SERVICES

(71) Applicant: Microsoft Technology Licensing, LLC, Redmond, WA (US)

(72) Inventors: Sunitha Gupta, Kirkland, WA (US); Jaskaran Singh, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 196 days.

(21) Appl. No.: 15/835,279

(22) Filed: Dec. 7, 2017

(65) Prior Publication Data

US 2019/0182330 A1    Jun. 13, 2019

(51) Int. Cl.
*H04L 29/08* (2006.01)
*G06Q 10/10* (2012.01)

(52) U.S. Cl.
CPC ......... *H04L 67/125* (2013.01); *G06Q 10/107* (2013.01); *G06Q 10/1095* (2013.01); *H04L 67/10* (2013.01); *H04L 67/16* (2013.01); *H04L 67/22* (2013.01)

(58) Field of Classification Search
CPC ....... H04L 67/125; H04L 67/22; H04L 67/10; H04L 67/16; G06Q 10/1095; G06Q 10/107
See application file for complete search history.

(56) References Cited

U.S. PATENT DOCUMENTS 8,074,214 B2    12/2011  Isaacson et al.
8,302,108 B1    10/2012  Hurren et al.
8,626,141 B2    1/2014   Davies-Moore et al.
8,751,582 B1    6/2014   Behforooz et al.
8,832,205 B2    9/2014   Nelson et al.
9,197,590 B2    11/2015  Beausoleil et al.
9,392,312 B1 *  7/2016   Lewis .................. H04N 21/266
9,582,252 B1    2/2017   Ogilvie
2006/0209900 A1* 9/2006  Sekaran .................. H04L 67/10
                                                                370/503

(Continued)

OTHER PUBLICATIONS

"International Search Report and Written Opinion Issued in PCT Application No. PCT/US2018/062376", dated Feb. 26, 2019, 12 Pages.

(Continued)

*Primary Examiner* — Soe Hlaing

(74) *Attorney, Agent, or Firm* — Liang IP, PLLC

(57) ABSTRACT

Techniques of automatic subscription control in distributed computing systems are disclosed herein. In one embodiment, a method includes using a server to monitor a utilization level of an automatically subscribed computing service by a user. The method also includes determining whether the utilization level of the user with the automatically subscribed computing service is below a preset threshold. When the utilization level of the user is below the preset threshold, the server automatically unsubscribes the user from the computing service. While the computing service remains automatically unsubscribed to by the user, the server can monitor for a new version or update of the computing service. Upon detecting a new version or update, the server can automatically re-subscribe the user to the computing service of the new version without user input.

20 Claims, 8 Drawing Sheets

(56) References Cited

U.S. PATENT DOCUMENTS

2009/0288080 A1 11/2009 Partridge
2015/0256499 A1* 9/2015 Kumar .................. G06F 16/958
　　　　　　　　　　　　　　　　　　　　　　709/206

OTHER PUBLICATIONS

"Feature Flags", Retrieved from: <<https://web.archive.org/web/20160904231616/https:/launchdarkly.com/featureflags.html>>, Sep. 4, 2016, 16 Pages.

* cited by examiner

AUTOMATIC SUBSCRIPTION MANAGEMENT OF COMPUTING SERVICES

BACKGROUND

Remote or "cloud" computing typically utilizes a collection of virtual machines or other remote servers, rather than local servers or personal computers, to process, manage, or store user data. A communications network can interconnect the remote servers as nodes to form a computing fabric. During operation, one or more nodes of the computing fabric can cooperate with one another to provide a distributed computing environment that facilitates execution of various software applications to provide corresponding computing services.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Remote computing can offer a wide variety of computation, storage, or other suitable types of computing services to users based on service subscription. For example, a user can subscribe to a hosted email service provided by a remote email server that is managed by a service provider. Based on the service subscription of the user, the user has access to emails, calendar, reminders, tasks, and other items hosted on the remote email server. For example, the remote email server can facilitate the user to setup meetings by transmitting meeting invitations via emails.

From time to time, the service provider can deploy new services, update existing services, features, or otherwise alter the computing services available to the user. For example, the service provider can deploy a new conversational scheduling service to users subscribed to the hosted email service. The conversation scheduling service can, with user permission, monitor user conversations in emails for detecting a meeting intent among users. In response to a detected meeting intent, the conversational scheduling service can be configured to automatically generate and transmit a meeting suggestion (e.g., as an email) to the users. The meeting suggestion can include an email that provides access to one or more actions, for instance, generating an electronic meeting invitation for scheduling the meeting. As such, the conversational scheduling service can simplify meeting scheduling and improve efficiency of arranging for such meetings.

Though new features or computing services can potentially offer improved user experience, the inventors have recognized that sometimes, early versions of new features or computing services can be rather limited in functionality, user friendliness, or have other shortcomings. As such, users experiencing the early versions may opt to unsubscribe from such new features or computing services due to negative user experience. Once unsubscribed, the users may not experience any later versions of the features or computing services even though the later versions have additional functionalities, improved user friendliness, better designed user interfaces, or other functional improvements.

Several embodiments of the disclosed technology can address at least some aspects of the foregoing difficulties by implementing automatic subscription control of features or computing services without user intervention. For example, in certain embodiments, once a new feature or computing service is initialized and provided to the users, a subscription controller can monitor for user interaction or utilization of the provided new feature or computing service. Thus, for the example conversational scheduling feature above, the subscription controller can be configured to detect whether a user receiving such meeting suggestions have acted on the meeting suggestions. If the user has not acted on a certain number (e.g., three or four) of the meeting suggestions, the subscription controller can automatically unsubscribe the user from the conversational scheduling feature, without user input. In other embodiments, the foregoing subscription decision can also be based on an elapsed time since the user received a meeting suggestion, or based on other suitable conditions.

The subscription controller can also be configured to monitor for new versions, updates, or other suitable modifications to features or computing services after the subscription controller has automatically unsubscribed the user. In response to detecting a new version of a feature or computing service, the subscription controller can determine whether to restart the feature or computing service for the user. For example, if an update is simply a bug fix to the feature or computing service, the subscription controller can determine not to restart the feature of computing service. On the other hand, if the update is a new release of the feature or computing service, the subscription controller can decide to restart the feature or computing service. Thus, in response to determining that the feature or computing service should be restarted, the subscription controller can automatically re-subscribe the user to the feature or computing service of the new version, without user input. The subscription controller can then continue to monitor for user interaction as discussed above.

Several embodiments of the disclosed technology can thus allow users to experience new features or computing services without user intervention. Unlike in other computing systems, the subscription controller can automatically detect user interaction with a new feature or computing service. Based on the detected user interaction, the subscription controller can deduce whether a user is interested in using such a new feature or computing service. If the user is deemed not interested in the new feature or computing service, the subscription controller can automatically unsubscribe the user from the new feature or computing service. However, later on, if a new and improved version of the feature or computing service (e.g., with an improved user interface) becomes available, the subscription controller can automatically re-subscribe the user to the feature or computing service again, without user input. As such, several embodiments of the disclosed technology can allow the service provider to provide a better user experience to any features or computing services accessible to the users.

DETAILED DESCRIPTION

Figure 1:
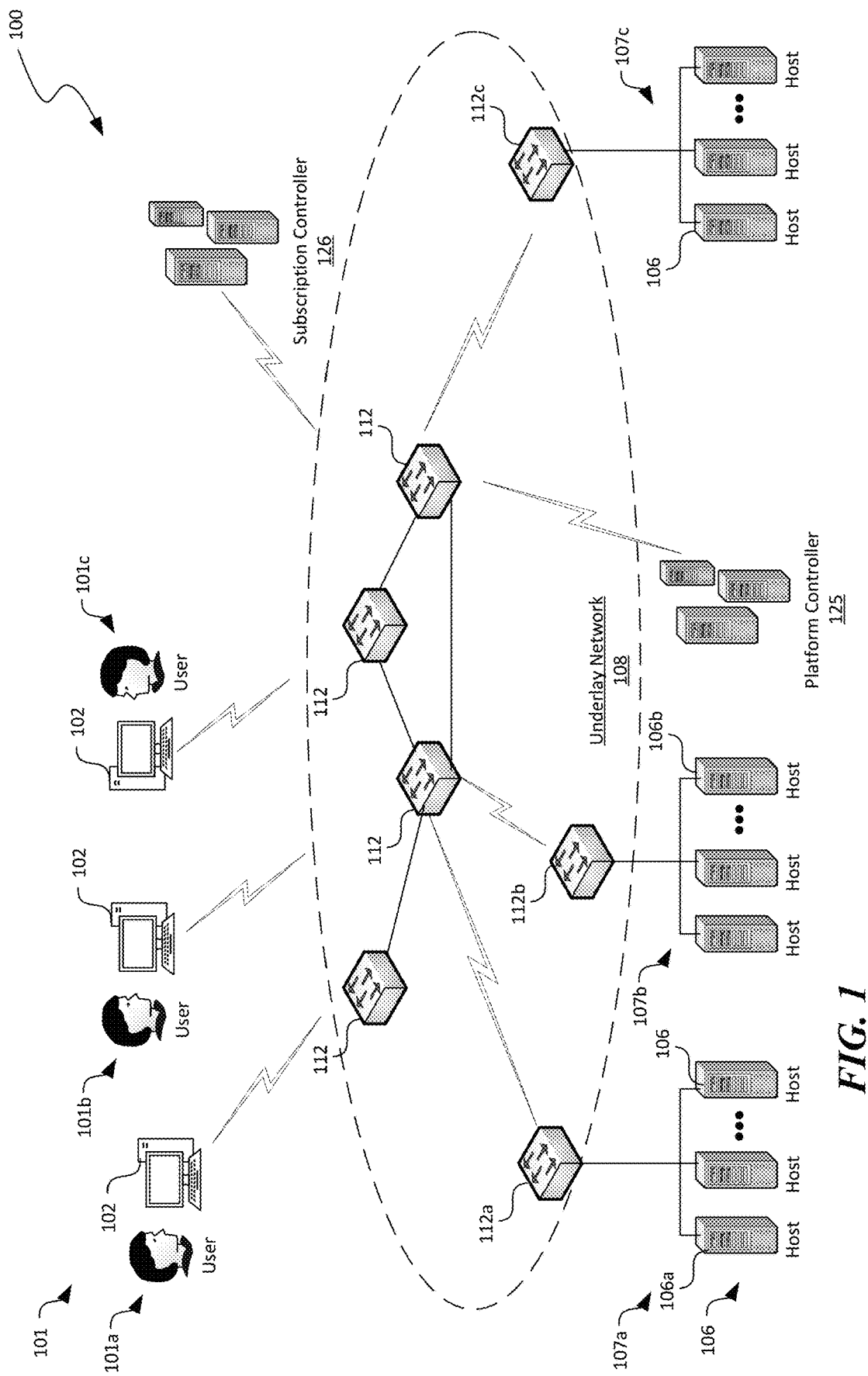
FIG. 1 is a schematic diagram illustrating a distributed computing system implementing automatic subscription control in accordance with embodiments of the disclosed technology.

Certain embodiments of systems, devices, components, modules, routines, data structures, and processes for automatic subscription control for computing services provided by datacenters or other suitable distributed computing systems are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-5.

As used herein, the term "distributed computing system" generally refers to an interconnected computer network having a plurality of network nodes that connect a plurality of servers or hosts to one another or to external networks (e.g., the Internet). The term "network node" generally refers to a physical network device. Example network nodes include routers, switches, hubs, bridges, load balancers, security gateways, or firewalls. A "host" generally refers to a physical computing device configured to implement, for instance, one or more virtual machines or other suitable virtualized components. For example, a host can include a server having a hypervisor configured to support one or more virtual machines or other suitable types of virtual components.

A computer network can be conceptually divided into an overlay network implemented over an underlay network. An "overlay network" generally refers to an abstracted network implemented over and operating on top of an underlay network. The underlay network can include multiple physical network nodes interconnected with one another. An overlay network can include one or more virtual networks. A "virtual network" generally refers to an abstraction of a portion of the underlay network in the overlay network. A virtual network can include one or more virtual end points referred to as "tenant sites" individually used by a user or "tenant" to access the virtual network and associated computing, storage, or other suitable resources. A tenant site can host one or more tenant end points ("TEPs"), for example, virtual machines. The virtual networks can interconnect multiple TEPs on different hosts. Virtual network nodes in the overlay network can be connected to one another by virtual links individually corresponding to one or more network routes along one or more physical network nodes in the underlay network.

Also used herein, the term "computing service," "service," or "feature" generally refers to one or more computing resources provided over a computer network such as the Internet. Example cloud services include software as a service ("SaaS"), platform as a service ("PaaS"), and infrastructure as a service ("Iaas"). SaaS is a software distribution technique in which software applications are hosted by a cloud service provider in, for instance, datacenters and accessed by users over a computer network. PaaS generally refers to delivery of operating systems and associated services over the computer network without requiring downloads or installation. IaaS generally refers to outsourcing equipment used to support storage, hardware, servers, network devices, or other components, all of which are made accessible over a computer network.

Also used herein, the term "subscription" or to "subscribe" to a computing service generally refers to obtaining a licensed access to a SaaS typically delivered via a computer network, such as the Internet. One example subscription can include Office365® provided by Microsoft Corporation of Redmond, Wash. To "unsubscribe" from a computing service generally refers to declining the licensed access to the computing service. Further used herein, an "interaction level" with a computing service generally refers to a level of user actions of interfacing or utilizing the computing service. Example user actions can include providing user input to the computing service as well as consuming output (e.g., messages) from the computing service.

Service providers can sometimes deploy new services, update existing services, or otherwise alter the computing services available to users based on service subscription. For example, the service provider can deploy a new version of a computing service or add a feature to an existing computing service. Though new features or computing services can potentially offer improved user experience, early versions of new features or computing services can sometimes be limited in functionality, user friendliness, or have other shortcomings. As such, users experiencing the early versions may opt to unsubscribe from such new features or computing services. Once unsubscribed, the users may not experience the same features or computing services even when later versions have additional functionalities, improved user friendliness, or other improvements.

Several embodiments of the disclosed technology can improve user experience of computing services by implementing automatic subscription control of features or computing services. In certain embodiments, once a new feature or computing service is automatically subscribed to by a user, a subscription controller can monitor for user interaction or utilization of the provided new feature or computing service. If the user has not acted on or utilize the computing service, the subscription controller can automatically unsubscribe the user from the computing service, without user input.

The subscription controller can also be configured to monitor for new versions, updates, or other suitable modifications to features or computing services that the subscription controller has automatically unsubscribed for the user. In response to detecting a new version of a feature or computing service, the subscription controller can decide to re-subscribe the user to the computing service of the new version. Thus, several embodiments of the disclosed technology can allow users to experience new features or computing services without user intervention, as described in more detail below with reference to FIGS. 1-5. In the description below, the automatic subscription control technique is described in the context of a distributed computing system. However, in other implementations, embodiments of the automatic subscription control can also be applied to computing services on a single computing device, or to computing services in other suitable computing environment.

FIG. 1 is a schematic diagram illustrating a distributed computing system 100 implementing automatic subscription control in accordance with embodiments of the disclosed technology. As shown in FIG. 1, the distributed computing system 100 can include an underlay network 108 interconnecting a plurality of hosts 106, a plurality of client devices 102 associated with corresponding users 101, a platform controller 125, and a subscription controller 126 operatively coupled to one another. Even though particular components of the distributed computing system 100 are shown in FIG. 1, in other embodiments, the distributed computing system 100 can also include additional and/or different components or arrangements. For example, in certain embodiments, the subscription controller 126 can be an integral part of the platform controller 125, or one or more of the hosts 106 providing, for instance, hosted email services. In other embodiments, the distributed computing system 100 can also include network storage devices, additional hosts, and/or other suitable components (not shown).

As shown in FIG. 1, the underlay network 108 can include one or more network nodes 112 that interconnect the multiple hosts 106, the users 101, and the platform controller 125. In certain embodiments, the hosts 106 can be organized into racks, action zones, groups, sets, or other suitable divisions. For example, in the illustrated embodiment, the hosts 106 are grouped into three host sets identified individually as first, second, and third host sets 107a-107c. In the illustrated embodiment, each of the host sets 107a-107c is operatively coupled to a corresponding network nodes 112a-112c, respectively, which are commonly referred to as "top-of-rack" or "TOR" network nodes. The TOR network nodes 112a-112c can then be operatively coupled to additional network nodes 112 to form a computer network in a hierarchical, flat, mesh, or other suitable types of topology. The computer network can allow communication between hosts 106, the platform controller 125, and the users 101. In other embodiments, the multiple host sets 107a-107c may share a single network node 112 or can have other suitable arrangements.

The hosts 106 can individually be configured to provide computing, storage, and/or other suitable cloud or other suitable types of computing services to the users 101 based on user subscriptions. For example, as described in more detail below with reference to FIG. 2, one of the hosts 106 can initiate and maintain one or more virtual machines 144 (shown in FIG. 2) upon requests from the users 101 when the users 101 have subscribed to such computing services. The users 101 can then utilize the initialized virtual machines 144 to perform computation, communication, and/or other suitable tasks, such as email hosting, meeting scheduling, etc. In certain embodiments, one of the hosts 106 can provide virtual machines 144 for multiple users 101. For example, the host 106a can host three virtual machines 144 individually corresponding to each of the users 101a-101c. In other embodiments, multiple hosts 106 can host virtual machines 144 for the users 101a-101c. As described in more detail herein, in certain implementations, certain computing services may be automatically subscribed to by the users 101, and the subscription controller 126 can be configured to manage such subscriptions automatically without user intervention.

The client devices 102 can each include a computing device that facilitates corresponding users 101 to access cloud services provided by the hosts 106 via the underlay network 108. For example, in the illustrated embodiment, the client devices 102 individually include a desktop computer. In other embodiments, the client devices 102 can also include laptop computers, tablet computers, smartphones, or other suitable computing devices. Even though three users 101 are shown in FIG. 1 for illustration purposes, in other embodiments, the distributed computing system 100 can facilitate any suitable number of users 101 to access cloud or other suitable types of computing services provided by the hosts 106.

The platform controller 125 can be configured to manage operations of various components of the distributed computing system 100. For example, the platform controller 125 can be configured to allocate virtual machines 144 (or other suitable resources) in the distributed computing system 100, monitor operations of the allocated virtual machines 144, or terminate any allocated virtual machines 144 once operations are complete. In certain examples, the platform controller 125 can also be configured to monitor and track versions, updates, or other modifications to applications and corresponding computing services available in the distributed computing system 100. In the illustrated implementation, the platform controller 125 is shown as an independent hardware/software component of the distributed computing system 100. In other embodiments, the platform controller 125 can also be a datacenter controller, a fabric controller, or other suitable types of controller or a component thereof implemented as a computing service on one or more of the hosts 106.

The subscription controller 126 can be configured to automatically manage subscriptions to various features or computing services by the users 101 in the distributed computing system 100. For example, in certain implementations, the subscription controller 126 can be configured to monitor a utilization level of a computing service by a user 101 after the computing device is automatically subscribed to by the user. The subscription controller 126 can also be configured to determine whether the utilization level of the user 101 with the automatically subscribed computing service is below a preset threshold. In response to determining that the utilization level of the user is below the preset threshold, the subscription controller 126 can automatically unsubscribe the user 101 from the computing service. While the computing service remains automatically unsubscribed to by the user 101, the subscription controller 126 can be configured to detect a new version or update of the computing service is now available in the distributed computing system 100. Upon detecting the new version or update, the subscription controller 126 can automatically re-subscribe the user 101 to the computing service of the new version. As such, the user 101 can experience new features or computing services without user intervention, as described in more detail below with reference to FIGS. 3A-3C.

Figure 2:
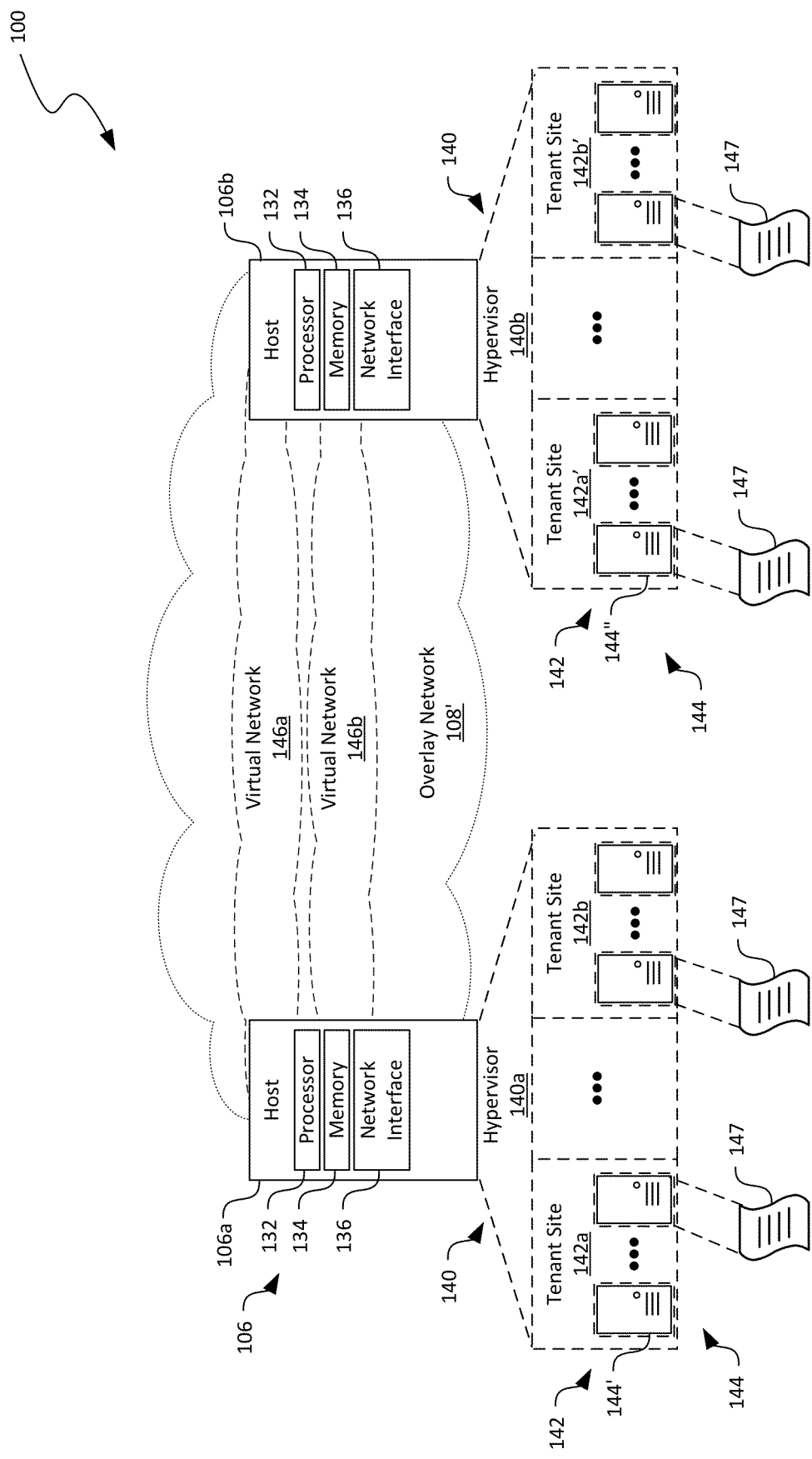
FIG. 2 is a schematic diagram illustrating certain hardware/software components of the distributed computing system of FIG. 1 in accordance with embodiments of the disclosed technology.

FIG. 2 is a schematic diagram illustrating certain hardware/software components of the distributed computing system 100 in accordance with embodiments of the disclosed technology. In particular, FIG. 2 illustrates an overlay network 108' that can be implemented on the underlay network 108 in FIG. 1. Though particular configuration of the overlay network 108' is shown in FIG. 2, in other embodiments, the overlay network 108' can also be configured in other suitable ways. In FIG. 2, only certain components of the underlay network 108 of FIG. 1 are shown for clarity.

In FIG. 2 and in other Figures herein, individual software components, objects, classes, modules, and routines may be a computer program, procedure, or process written as source code in C, C++, C #, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices.

Equally, components may include hardware circuitry. A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 2, the first host 106a and the second host 106b can each include a processor 132, a memory 134, and an input/output component 136 operatively coupled to one another. The processor 132 can include a microprocessor, a field-programmable gate array, and/or other suitable logic devices. The memory 134 can include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the processor 132 (e.g., instructions for performing the methods discussed below with reference to FIGS. 4A and 4B). The input/output component 136 can include a display, a touch screen, a keyboard, a mouse, a printer, and/or other suitable types of input/output devices configured to accept input from and provide output to an operator and/or an automated software controller (not shown).

The first and second hosts 106a and 106b can individually contain instructions in the memory 134 executable by the processors 132 to cause the individual processors 132 to provide a hypervisor 140 (identified individually as first and second hypervisors 140a and 140b) and a status agent 141 (identified individually as first and second status agent 141a and 141b). Even though the hypervisor 140 and the status agent 141 are shown as separate components, in other embodiments, the status agent 141 can be a part of the hypervisor 140 or an operating system (not shown) executing on the corresponding host 106. In further embodiments, the status agent 141 can be a standalone application.

The hypervisors 140 can individually be configured to generate, monitor, terminate, and/or otherwise manage one or more virtual machines 144 organized into tenant sites 142. For example, as shown in FIG. 2, the first host 106a can provide a first hypervisor 140a that manages first and second tenant sites 142a and 142b, respectively. The second host 106b can provide a second hypervisor 140b that manages first and second tenant sites 142a' and 142b', respectively.

The hypervisors 140 are individually shown in FIG. 2 as a software component. However, in other embodiments, the hypervisors 140 can be firmware and/or hardware components. The tenant sites 142 can each include multiple virtual machines 144 for a particular tenant (not shown). For example, the first host 106a and the second host 106b can both host the tenant site 142a and 142a' for a first tenant 101a (FIG. 1). The first host 106a and the second host 106b can both host the tenant site 142b and 142b' for a second tenant 101b (FIG. 1). Each virtual machine 144 can be executing a corresponding operating system, middleware, and/or applications 147.

Also shown in FIG. 2, the distributed computing system 100 can include an overlay network 108' having one or more virtual networks 146 that interconnect the tenant sites 142a and 142b across multiple hosts 106. For example, a first virtual network 142a interconnects the first tenant sites 142a and 142a' at the first host 106a and the second host 106b. A second virtual network 146b interconnects the second tenant sites 142b and 142b' at the first host 106a and the second host 106b. Even though a single virtual network 146 is shown as corresponding to one tenant site 142, in other embodiments, multiple virtual networks 146 (not shown) may be configured to correspond to a single tenant site 146.

The virtual machines 144 can be configured to execute one or more applications 147 to provide suitable cloud or other suitable types of computing services to the users 101 (FIG. 1). The virtual machines 144 on the virtual networks 146 can also communicate with one another via the underlay network 108 (FIG. 1) even though the virtual machines 144 are located on different hosts 106. Communications of each of the virtual networks 146 can be isolated from other virtual networks 146. In certain embodiments, communications can be allowed to cross from one virtual network 146 to another through a security gateway or otherwise in a controlled fashion. A virtual network address can correspond to one of the virtual machine 144 in a particular virtual network 146. Thus, different virtual networks 146 can use one or more virtual network addresses that are the same. Example virtual network addresses can include IP addresses, MAC addresses, and/or other suitable addresses.

Figure 3A:
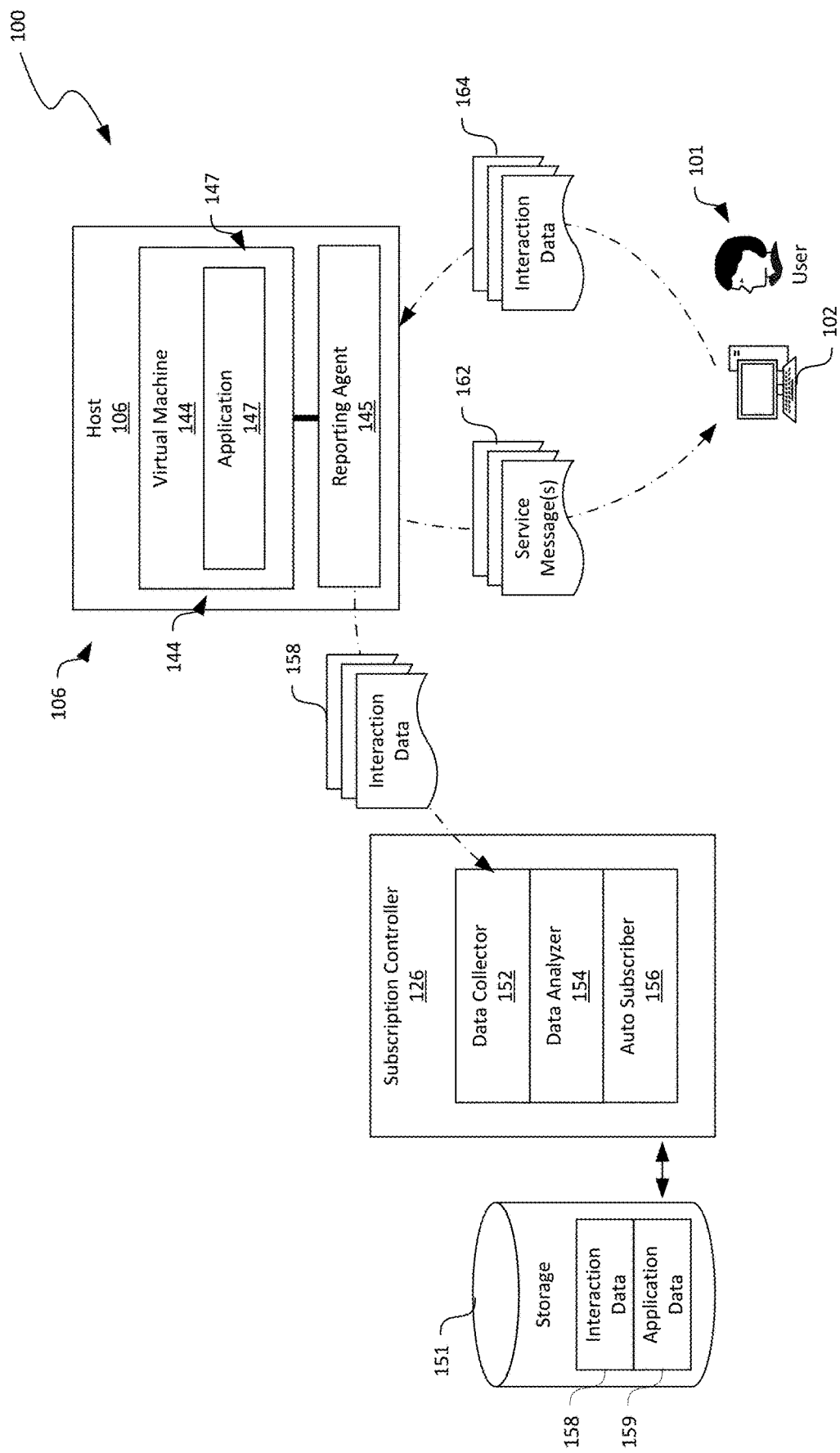
FIGS. 3A-3C are block diagrams of certain hardware/software components of the distributed computing system of FIG. 1 during certain stages of automatic subscription control in the distributed computing system of FIG. 1 in accordance with embodiments of the disclosed technology.
Figure 3B:
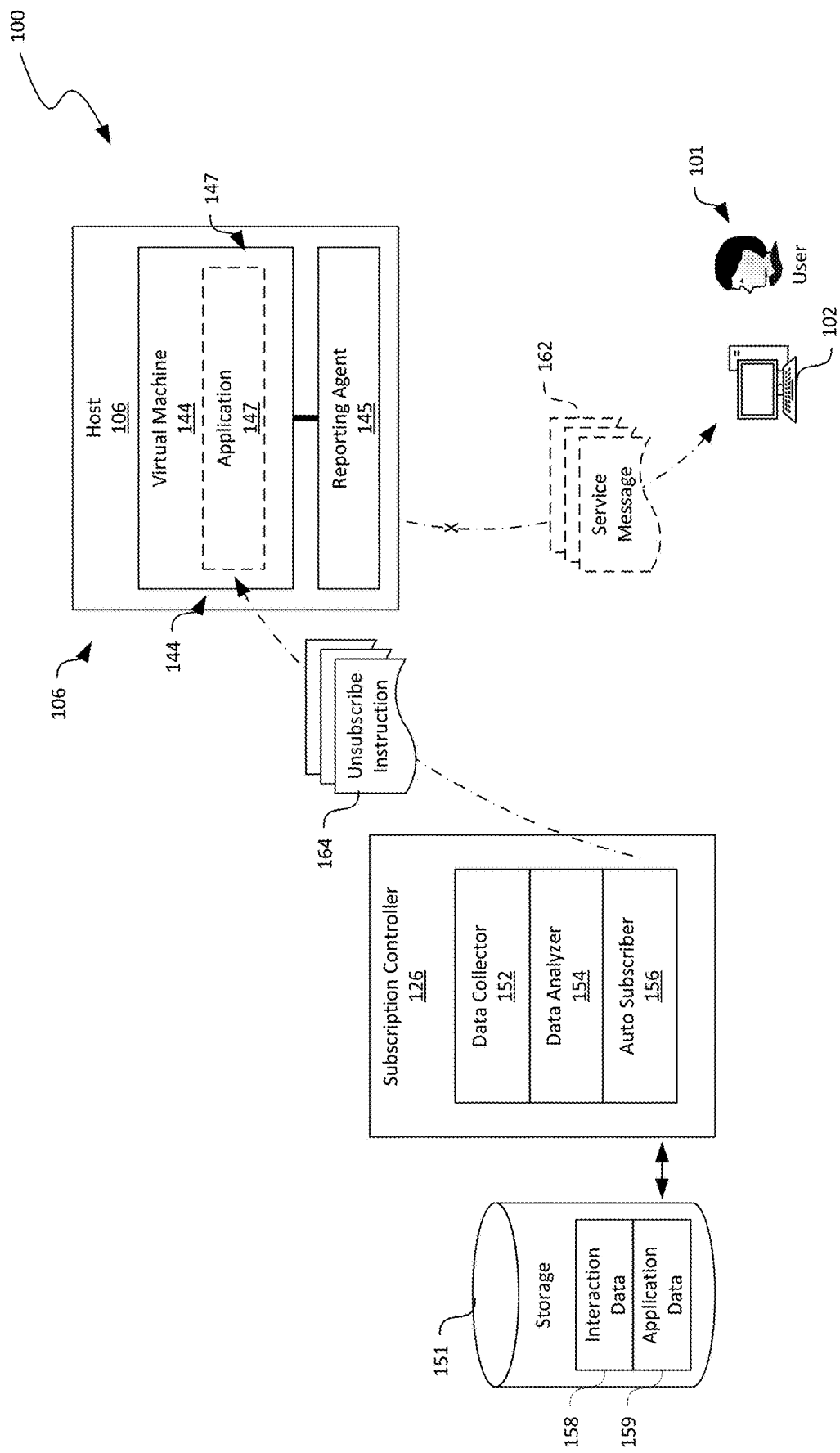
Figure 3C:
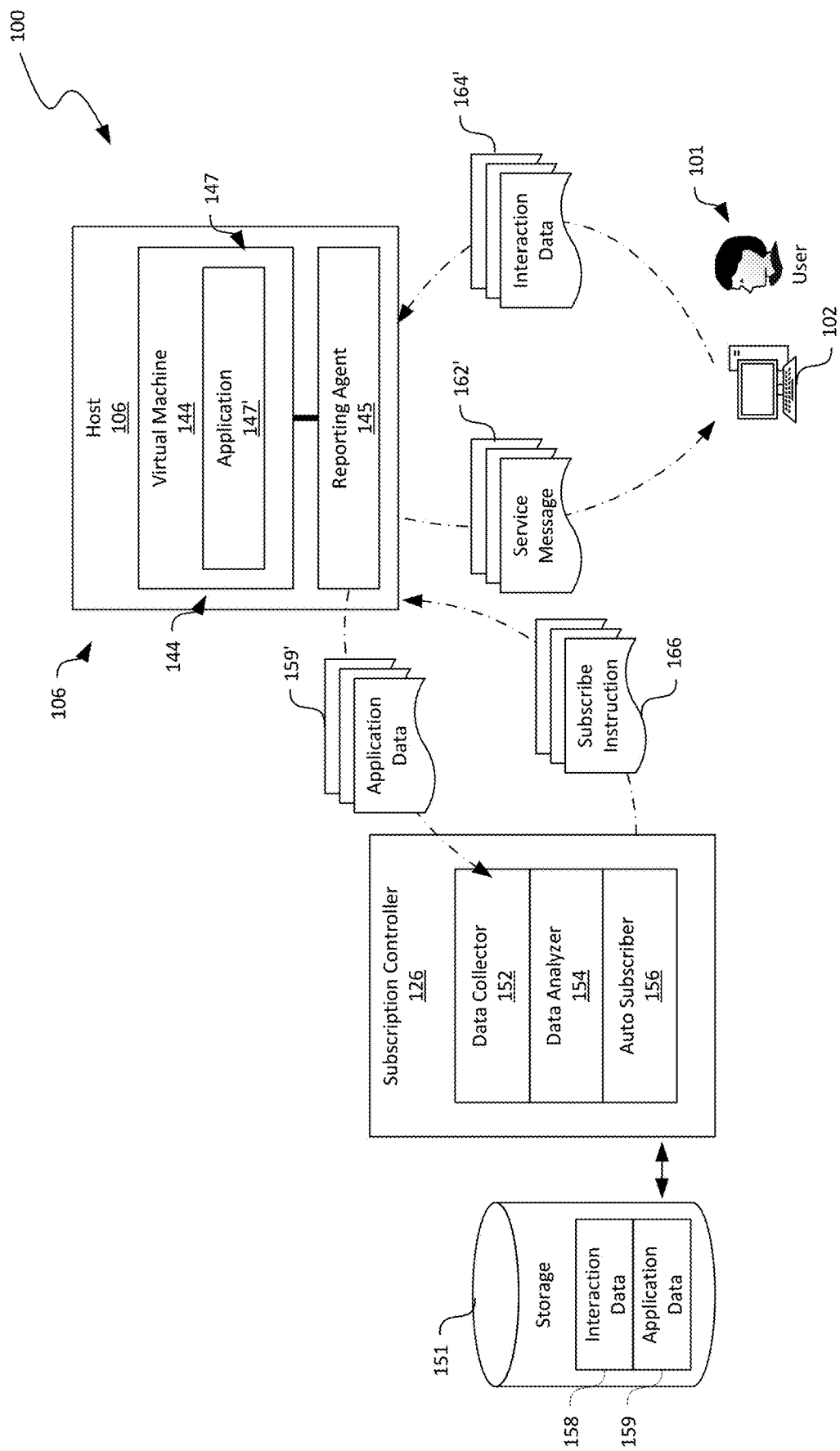

FIGS. 3A-3C are block diagrams of certain hardware/software components of the distributed computing system 100 of FIG. 1 during certain stages of automatic subscription control in the distributed computing system 100 of FIG. 1 in accordance with embodiments of the disclosed technology. In FIGS. 3A-3C, only one host 106 and the subscription controller 126 are shown for illustration purposes.

As shown in FIG. 3A, the host 106 can execute suitable instructions to provide a virtual machine 144 in which an application 147 is executed to provide a corresponding computing service. In the illustrated embodiment, the computing service can include one that generates one or more service messages 162 transmitted to the client device 102 for a user 101 via the underlay/overlay network 108 and 108'. Example service messages 162 can include emails, electronic notifications, simple text messages, or other suitable types of messages.

In one example, the computing service provided to the user 101 can include a conversational scheduling service. The conversation scheduling service can, with permission from the user 101, monitor user conversations in emails for detecting a meeting intent among users 101. In response to a detected meeting intent, the conversational scheduling service can be configured to automatically generate and transmit a service message 162 in the form of a meeting suggestion to the user 101. The meeting suggestion can include an email that provides access to one or more actions, for instance, generating an electronic meeting invitation for scheduling the meeting. As such, the conversational scheduling service can simplify meeting scheduling and improve efficiency of arranging for such meetings.

In another example, the computing service provided to the user 101 can include a notification service for upcoming agenda items collected, with permission of the user 101, from an electronic calendar associated with the user 101. In such an example, the service message 162 can include an email containing data representing upcoming appointments, scheduled meetings, or other suitable calendar items. In further examples, the computing service provided to the user 101 can also include services for map direction suggestion, current driving time notification, or other suitable computing services. Though only one application 147 is shown in FIGS. 3A-3C for illustration purposes, in other embodiments, the host 106 can also execute multiple applications 147 (not shown) in one or more virtual machines 144.

As shown in FIG. 3A, the host 106 can also execute additional instructions to provide a reporting agent 145 configured to generate interaction data 158 related to the provided computing service. The reporting agent 145 can be a part of the operating system, hypervisor 140 (FIG. 2), or other suitable components on the host 106. In one embodiment, the reporting agent 145 can monitor any interactions by the user 101 with the service messages 162. For example, the reporting agent 145 can track whether the user 101 has clicked on a link included in the service messages 162 to, for instance, generate and transmit a suggested meeting invitation. In another example, the reporting agent 145 can also track whether the user 101 has clicked on any of the calendar items to retrieve further information. In other examples, the reporting agent 145 can detect whether the user 101 has read the service messages 162, deleted the service messages 162 with or without reading, or other suitable actions taken by the user 101.

Once the interaction data 158 is generated, the reporting agent 145 can also provide the generated interaction data 158 to the subscription controller 126 periodically or in other suitable manners. Such reporting can be upon request from the subscription controller 126, without any prompt from the subscription controller 126, or in other suitable manners. Even though the reporting agent 145 is described above as being configured to generate and report the interaction data 158, in other embodiments, the host 106 may provide the generating and reporting functionalities related to the interaction data 158 using separate applications, modules, or routines.

As shown in FIG. 3A, the subscription controller 126 can be operatively coupled to a computer readable storage 151. The subscription controller 126 can also include a data collector 152, a data analyzer 154, and an auto subscriber 156 operatively coupled to one another. Even though particular components and configurations of the subscription controller 126 are shown in FIGS. 3A-3C, in other embodiments, the subscription controller 126 can also include other suitable components or arrangements. For example, in certain embodiments, the computer readable storage 151 can be an internal non-volatile storage of a computing device implementing the subscription controller 126. In other examples, the computer readable storage 151 can also be a network storage space in the distributed computing system 100.

The computer readable storage 151 can contain records of interaction data 158 and application data 159. The interaction data 158 can include data representing a level of utilization or interaction with a computing service provided by one or more hosts 106 (FIG. 1) in the distributed computing system 100. In the illustrated embodiment in FIG. 3A, interaction data 158 is provided to the subscription controller 126 from the reporting agent 145 of host 106. In other embodiments, the platform controller 125 (FIG. 1) or other suitable components of the distributed computing system 100 can be configured to provide the interaction data 158 or other suitable types of data to the subscription controller 126.

The application data 159 can include data representing a version, update, build, or other suitable edition information related to an application 147 configured to provide a corresponding computing service. In one example, the application data 159 can contain a series of integers delineated by periods, such as, "10.1.16," in which "10" designates a main version number while "1" and "16" designate a subversion number and a build number, respectively. In other examples, the application data 159 can also contain other suitable types of numbers or alphanumerical values that represent edition information of the application 147. In further examples, the application data 159 can also contain comments such as "bug fix," "user interface update," or other suitable details of modifications in addition to or in lieu of the edition information.

The data collector 152 can be configured to collect interaction data 158 from one or more applications 147 or the virtual machines 144 hosted on the host 106. In certain embodiments, the data collector 152 can query the host 106 for the interaction data 158 regarding utilization of the computing service corresponding to the application 147 periodically or in other suitable manners. In turn, the data collector 152 can be configured to receive the requested interaction data 158 from the reporting agent 145. In other embodiments, the data collector 152 can simply receive the interaction data 158 from the reporting agent 145 without any prompt. In further embodiments, the data collector 152 can be configured to implement a combination of the foregoing data retrieving techniques. The data collector 152 can then provide the received interaction data 158 to the data analyzer 154 for further processing and store the interaction data 158 in the computer readable storage 151.

The data analyzer 154 can be configured to process the received interaction data 158 based on a preset interaction threshold. In certain embodiments, the data analyzer 154 can be configured to aggregate the received interaction data 158 related to the application 147 and obtain a total value of interaction level for a preset period (e.g., one week). In other embodiments, the data analyzer 154 can include a counter configured to obtain a number of service messages 162 transmitted to the user 101 and without interaction. In further embodiments, the data analyzer 154 can include routines for calculating an average, a medium, an elapsed time, or other suitable parameters for measuring an interaction level of the user 101 with the provided computing service.

The data analyzer 154 can also be configured to compare the processed interaction data 158 with a preset interaction threshold and indicate whether sufficient interaction has been detected based thereon. In one example, the data analyzer 154 can be configured to indicate that sufficient interaction has not been detected based on the following conditions:

when a number of service messages 162 have been transmitted to the user 101 but no interaction by the user 101 has been detected;

when a number of service messages 162 have been transmitted to the user 101 and have been deleted by the user 101 without being read; or when an elapsed time since one of the service messages 162 has been transmitted to the user 101 and remained without user interaction is above a present time threshold; or In other examples, the data analyzer 154 can be configured to indicate whether sufficient interaction has been detected based other suitable criteria. Based on the foregoing determination, the data analyzer 154 can then indicate to the auto subscriber 156 regarding whether indicate whether sufficient interaction with the computing service has been detected.

The auto subscriber 156 can be configured to automatically subscribe and/or unsubscribe the user 101 to the provided computing service corresponding to the application 147 based on the indication from the data analyzer 154. As shown in FIG. 3A, the auto subscriber 156 can automatically subscribe the user 101 to the provided computing service when the computing service is a new feature included in a service package according to a user subscription of the user 101, and that the computing service has not been automatically unsubscribed by the auto subscriber 156.

In another embodiment, the auto subscriber 156 can automatically unsubscribe the user 101 from the computing service when the data analyzer 154 indicates that sufficient interaction between the user 101 and the computing service has not been detected, as shown in FIG. 3B. In the illustrated example, the auto subscriber 156 can be configured to transmit an unsubscribe instruction 164 to the application 147, the virtual machine 144, or the host 106 for unsubscribing the user 101 from the computing service. In another example, the auto subscriber 156 can be configured to set an automatic subscription flag associated with the computing service and store the set automatic subscription flag in an email inbox of the user 101 on the host 106. In response, the host 106 can stop executing the application 147 (shown in phantom lines) and/or perform other suitable operations such that no additional service messages 162 (shown in phantom lines) are transmitted to the user 101 when the automatic subscription flag is set or when the unsubscribe instruction 164 is received. In further examples, the auto subscriber 156 can be configured to unsubscribe the user 101 from the computing service in other suitable manners.

Subsequently, a new version, update, or other suitable edition of the application 147' may be available on the host 106, as shown in FIG. 3C. In the illustrated embodiment, the reporting agent 145 can transmit additional application data 159' to the data collector 152 of the subscription controller 126 indicating the latest version, update, or edition of the application 147'. In response, the data analyzer 154 can be configured to determine whether the new version or update of the application 147' represents a significant change in the computing service based on a preset rule. For example, the preset rule can indicate a significant change if a version number and/or a subversion number of the application 147' is different than the original application 147 (FIG. 3A). In another example, the preset rule can indicate an insignificant change if the application data 159' includes a description that the update is only for bug fixes. In a further example, the preset rule can indicate a significant change if the application data 159' includes a description that the update contains a new user interface for the computing service. In yet further examples, the preset rule can indicate a significant change based on other suitable criteria.

As shown in FIG. 3C, when the data analyzer 154 indicates to the auto subscriber 156 that the new version, update, or other edition information of the application 147' represents a significant change, the auto subscriber 156 can automatically re-subscribe the user 101 to the new version, update, or edition of the computing service without user intervention. For example, in the illustrated example, the auto subscriber 156 can be configured to transmit a subscribe instruction 166 to the host 106. In other examples, the auto subscriber 156 can be configured to reset the automatic subscription flag of the computing service and storing the reset automatic subscription flag in the email inbox of the user 101 on the host 106. In response, the host 106 can determining whether the automatic subscription flag of the computing service is set for the user 101. In response to determining that the automatic subscription flag of the computing service is not set for the user 101, re-initialize the computing service for the user 101.

Several embodiments of the distributed computing system 100 can thus allow the user 101 to experience new features or computing services without user intervention. Unlike in certain other computing systems, the subscription controller 126 can automatically subscribe the user 101 to and detect user interaction with a new feature or computing service. Based on the detected user interaction, the subscription controller 126 can deduce whether a user is interested in using such a new feature or computing service. If the user 101 is deemed not interested in the new feature or computing service due to various reasons, the subscription controller 126 can automatically unsubscribe the user 101 from the new feature or computing service. However, later, if a new and improved version of the feature or computing service (e.g., with an improved user interface) becomes available, the subscription controller 126 can automatically re-subscribe the user 101 to the feature or computing service again, without user input. As such, the distributed computing system 100 can provide a better user experience to any features or computing services accessible to the user 101.

Figure 4A:
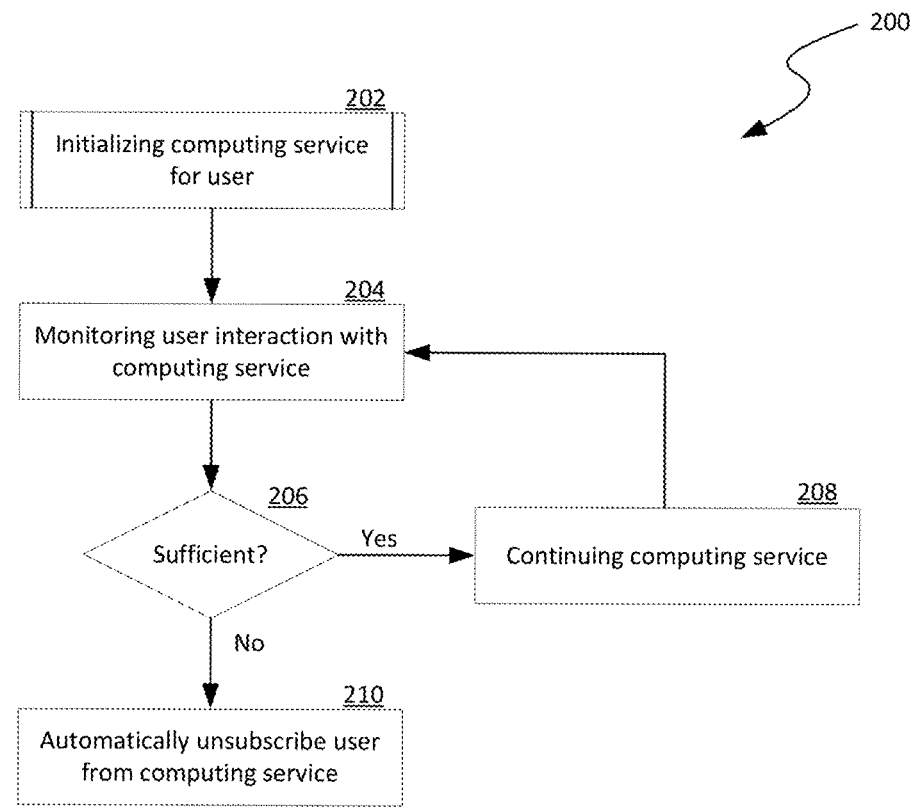
FIGS. 4A-4C are flowcharts illustrating processes of automatic subscription control in a distributed computing system in accordance with embodiments of the disclosed technology.
Figure 4B:
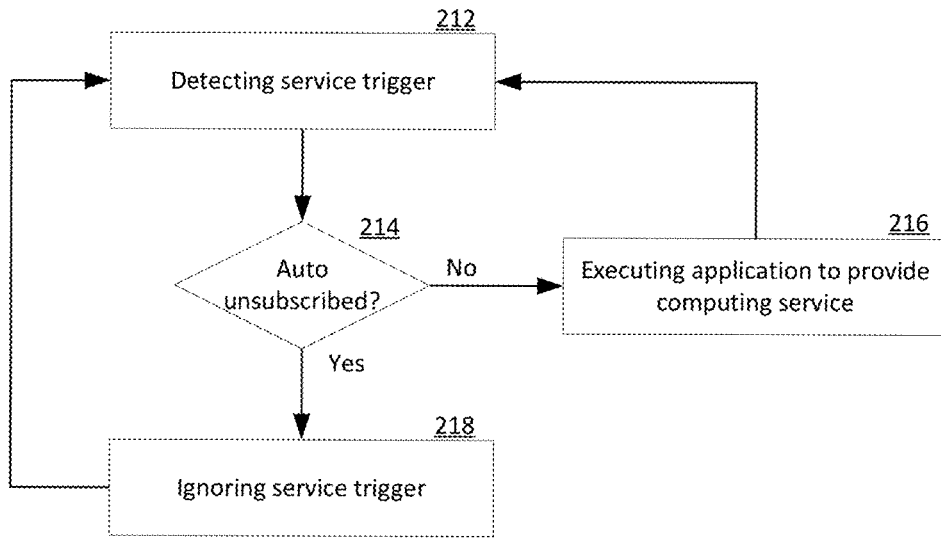

FIGS. 4A and 4B are flowcharts illustrating processes of automatic subscription control in a distributed computing system 100 in accordance with embodiments of the disclosed technology. Even though the processes are described in relation to the distributed computing system 100 of FIGS. 1 and 2 and the hardware/software components of FIGS. 3A-3C, in other embodiments, the processes can also be implemented in other suitable computing systems.

As shown in FIG. 4A, a process 200 includes initializing a computing service for a user at stage 202. In one embodiment, the computing service can be automatically subscribed to by the user without user input when, for example, the computing service is a new feature included in a service package according to a service subscription of the user. Example operations of initializing the computing service are described in more detail below with reference to FIG. 4B. The process 200 can then include monitoring user interaction with the provided computing service at stage 204. Various techniques may be used to determine an interaction level of the user to the computing service. Examples of such techniques are described above with reference to FIGS. 3A-3C. The process 200 can then include a decision stage 206 to determine whether sufficient interaction with the computing service by the user is detected. In response to determining that sufficient interaction with the computing service by the user is detected, the process 200 proceeds to continuing the computing service 208 before reverting to monitoring further user interaction with the computing service at stage 204. Otherwise, the process 200 proceeds to automatically unsubscribing the user from the computing service at stage 210. Example techniques for automatically unsubscribing the user from the computing service are described above with reference to FIGS. 3A-3C.

FIG. 4B illustrates example operations for initializing a computing service for a user. As shown in FIG. 4B, the operations can include detecting a service trigger at stage 212. A service trigger can include an indication of a new computing service or feature, or other suitable indicators. The operations can then include a decision stage 214 to determine whether the user has been automatically unsubscribed from the computing service, for example, based on a current value of an automatic subscription flag stored in a mailbox of the user, as described in more detail above with reference to FIGS. 3A-3C. In response to determining that the user has been automatically unsubscribed from the computing service, the operations include ignoring the service trigger and terminating the initialization process at stage 218. Otherwise, the operations include executing a corresponding application to provide the computing service at stage 216.

Figure 4C:
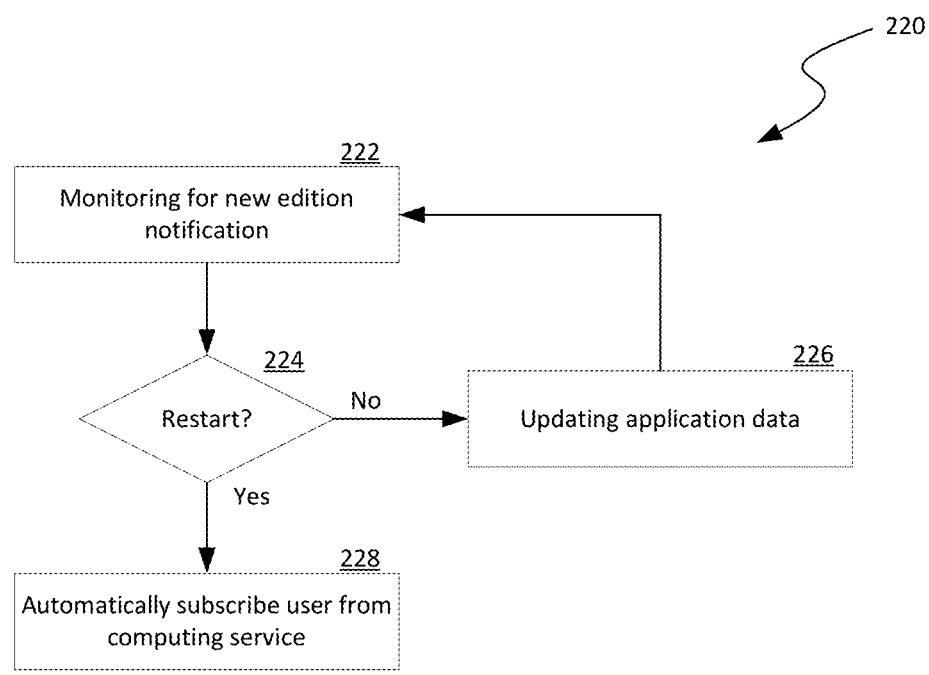

FIG. 4C illustrates a process 220 for automatically re-subscribing a user to a previously unsubscribed computing service. As shown in FIG. 4C, the process 220 can include monitoring for a new edition notification regarding the computing service at stage 222. The process 220 can then include a decision stage 224 to determine whether to restart the subscription to the computing service. In certain embodiments, the process 220 can indicate to restart the computing service by determining whether a significant change in the computing service is detected based on the new edition notification, as described in more detail above with reference to FIG. 3C. In other embodiments, the process 220 can restart the subscription when any new edition notification is received. In response to determining to restart the subscription, the process 220 can include automatically subscribe the user to the new edition of the computing device at stage 228. Example operations for automatically subscribe the user to the computing service are described in more detail above with reference to FIG. 3C. Once restarted, the process 220 can further include monitoring for user interaction with the computing service, such as that described above with reference to FIG. 4A. Otherwise, the process 220 can include updating application data 159 (FIG. 3C) corresponding to the computing service before reverting to monitoring for additional new edition notifications at stage 222.

Figure 5:
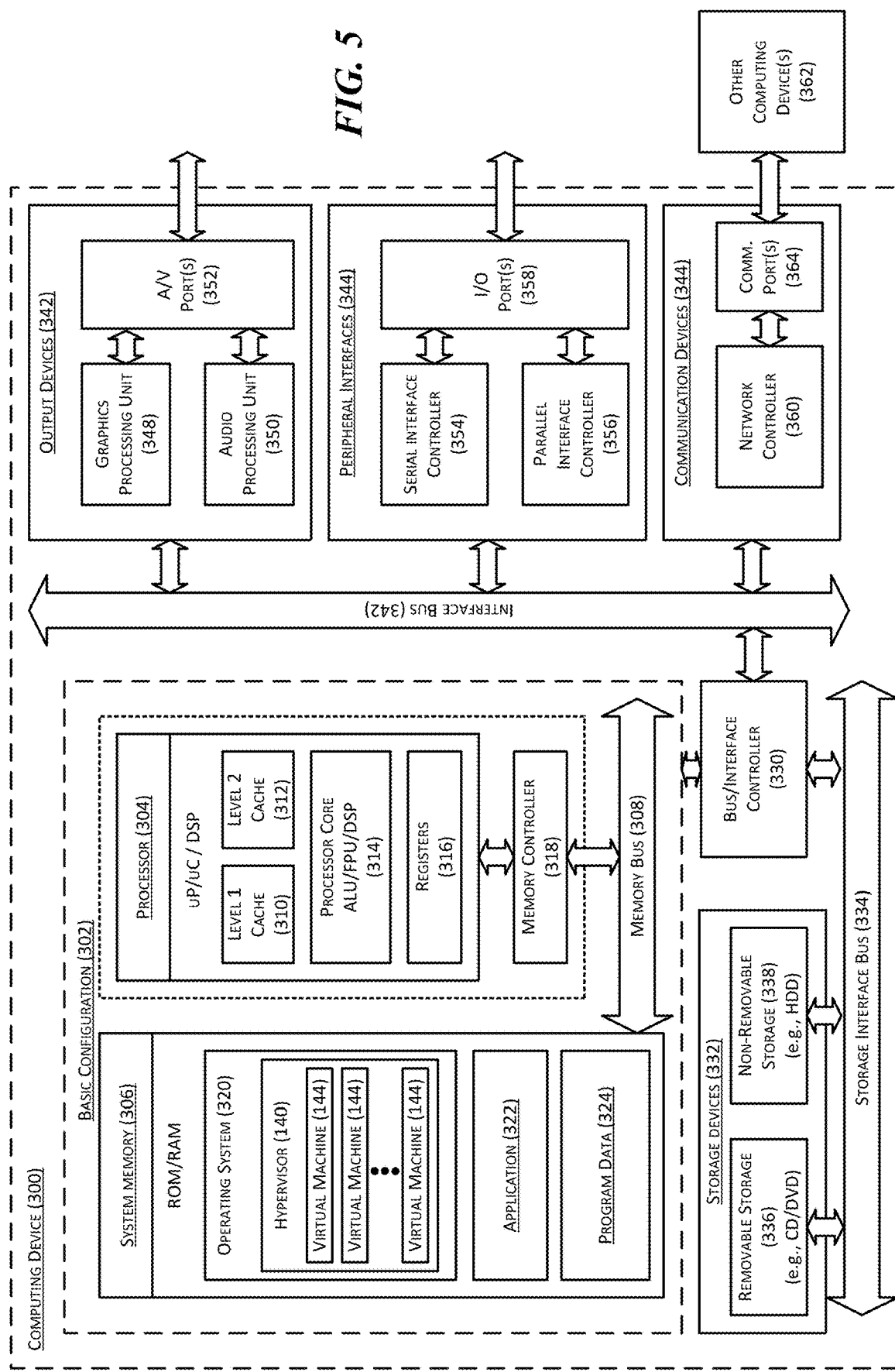
FIG. 5 is a computing device suitable for certain components of the distributed computing system in FIG. 1.

FIG. 5 is a computing device 300 suitable for certain components of the distributed computing system 100 in FIG. 1. For example, the computing device 300 can be suitable for the hosts 106, the client devices 102, the platform controller 125, or the subscription controller 126 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. As shown in FIG. 5, the operating system 320 can include a hypervisor 140 for managing one or more virtual machines 144. This described basic configuration 302 is illustrated in FIG. 8 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

Specific embodiments of the technology have been described above for purposes of illustration. However, various modifications can be made without deviating from the foregoing disclosure. In addition, many of the elements of one embodiment can be combined with other embodiments in addition to or in lieu of the elements of the other embodiments. Accordingly, the technology is not limited except as by the appended claims.

We claim:

1. A method performed by a server in a distributed computing system having a plurality of servers interconnected by a computer network, the method comprising:
   initializing a computing service for a user, the initialized computing service being provided by one or more of the servers in the distributed computing system;
   upon initializing the computing service,
      receiving data representing an interaction level of the user with the initialized computing service;
      analyzing the received data to determine whether the interaction level of the user is below a preset threshold;
      in response to determining that the interaction level of the user is below the preset threshold, automatically unsubscribing the user from the computing service; and
   while the computing service remains automatically unsubscribed to by the user,
      receiving a notification of a new version or update of the automatically unsubscribed computing service being available in the distributed computing system; and
      in response to receiving the notification, automatically re-initializing the computing service of the new version for the user in the distributed computing system without user input.

2. The method of claim 1 wherein initializing the computing service for the user includes:
   detecting a meeting intent based on content in emails of the user; and
   upon detecting a meeting intent, generating and transmitting, via the computer network, an email with a meeting suggestion for scheduling a meeting with the user.

3. The method of claim 1 wherein initializing the computing service for the user includes:
   determining whether the computing service has been previously automatically unsubscribed; and
   in response to determining that the computing service has not been previously automatically unsubscribed, instructing the one or more servers in the distributed computing system to execute an application configured to provide the computing service.

4. The method of claim 1 wherein:
automatically unsubscribing the user includes setting an automatic subscription flag of the computing service and storing the set automatic subscription flag in an email inbox of the user on the one or more servers; and
initializing the computing service for the user includes:
   determining whether the automatic subscription flag of the computing service is set for the user; and
   in response to determining that the automatic subscription flag of the computing service is not set for the user, instructing the one or more servers in the distributed computing system to execute an application configured to provide the computing service.

5. The method of claim 1 wherein initializing the computing service for the user includes:
automatically unsubscribing the user includes setting an automatic subscription flag of the computing service and storing the set automatic subscription flag in an email inbox of the user on the one or more servers; and
initializing the computing service for the user includes:
   determining whether the automatic subscription flag of the computing service is set for the user; and
   in response to determining that the automatic subscription flag of the computing service is set for the user, terminating initialization of the computing service in the distributed computing system.

6. The method of claim 1 wherein:
initializing the computing service for the user includes providing the user with a plurality of service messages via email; and
receiving the data representing the interaction level of the user includes one of the following:
   receiving data representing a number of the service messages transmitted to the user and remained without user interaction; or
   receiving data representing an elapsed time since one of the service messages has been transmitted to the user and remained without user interaction.

7. The method of claim 6 wherein analyzing the received data to determine whether the interaction level of the user includes at least one of:
   determining whether the number of the service messages transmitted to the user and remained without user interaction is above a preset number threshold; or
   determining whether the elapsed time since one of the service messages has been transmitted to the user and remained without user interaction is above a present time threshold.

8. The method of claim 6 wherein:
analyzing the received data to determine whether the interaction level of the user includes at least one of:
   determining whether the number of the service messages transmitted to the user and remained without user interaction is above a preset number threshold; or
   determining whether the elapsed time since one of the service messages has been transmitted to the user and remained without user interaction is above a present time threshold; and
automatically unsubscribing the user includes setting an automatic subscription flag of the computing service and storing the set automatic subscription flag in an email inbox of the user on the one or more servers.

9. The method of claim 1, further comprising:
in response to receiving the notification,
determining whether the new version or update represents a significant change in the computing service based on a preset rule; and
in response to determining that the new version or update represents a significant change in the computing service based on the preset rule, automatically re-initializing the computing service of the new version for the user in the distributed computing system without user input.

10. A server in a distributed computing system having a plurality of additional servers interconnected by a computer network, the server comprising:
a processor; and
a memory containing instructions executable by the processor to cause the server to:
monitor a utilization level of a computing service by a user, the computing service being automatically subscribed to for the user by the server;
determine whether the utilization level of the user with the automatically subscribed computing service is below a preset threshold;
in response to determining that the utilization level of the user is below the preset threshold, automatically unsubscribe the user from utilizing the computing service; and
while the computing service remains automatically unsubscribed to by the user,
detect a new version or update of the automatically unsubscribed computing service being available in the distributed computing system; and
in response to detecting the new version or update, automatically re-subscribe the user to the computing service of the new version without user input.

11. The server of claim 10 wherein:
the computing service provides the user with a plurality of service messages via email; and
to monitor the utilization level includes one of the following:
to receive data representing a number of the service messages transmitted to the user and deleted by the user without user utilization; or
to receive data representing an elapsed time since one of the service messages has been transmitted to the user and remained without user interaction.

12. The server of claim 11 wherein to determine whether the utilization level of the user with the automatically initialized computing service is below the preset threshold includes at least one of:
to determine whether the number of the service messages transmitted to the user deleted by the user without user utilization is above a preset number threshold; or
to determine whether the elapsed time since one of the service messages has been transmitted to the user and remained without user interaction is above a present time threshold.

13. The server of claim 11 wherein:
to determine whether the utilization level of the user with the automatically initialized computing service is below the preset threshold includes at least one of:
to determine whether the number of the service messages transmitted to the user deleted by the user without user utilization is above a preset number threshold; or
to determine whether the elapsed time since one of the service messages has been transmitted to the user and remained without user interaction is above a present time threshold; and
to automatically unsubscribe the user includes to reset an automatic subscription flag of the computing service and storing the reset automatic subscription flag in an email inbox of the user on the one or more servers.

14. The server of claim 10 wherein the memory contains additional instructions executable by the processor to cause the server to:
in response to detecting the new version or update,
determine whether the new version or update represents a significant change in the computing service based on a preset rule; and
in response to determining that the new version or update represents a significant change in the computing service based on the preset rule, automatically re-sub scribe the user to the computing service of the new version without user input.

15. A method performed by a server in a distributed computing system having a plurality of servers interconnected by a computer network, the method comprising:
monitoring a utilization level of a computing service by a user, the computing service being automatically subscribed to for the user by the server;
determining whether the utilization level of the user with the automatically subscribed computing service is below a preset threshold;
in response to determining that the utilization level of the user is below the preset threshold, automatically unsubscribing, by the server, the user from the computing service; and
while the computing service remains automatically unsubscribed to by the user,
detecting that a new version or update of the automatically unsubscribed computing service is available in the distributed computing system;
in response to detecting the new version or update,
automatically re-subscribing the user to the computing service of the new version without user input; and
repeating the monitoring and determining operations by the server.

16. The method of claim 15 wherein:
the computing service is configured to receive one or more user input; and
monitoring the utilization level includes monitoring for one or more user input of the computing service from the user via the computer network.

17. The method of claim 15 wherein:
the computing service is configured to receive one or more user input;
monitoring the utilization level includes monitoring for one or more user input of the computing service from the user via the computer network; and
determining whether the utilization level of the user with the automatically subscribed computing service is below the preset threshold includes determining whether at least one user input related to the computing service has been received in a predetermined period of time.

18. The method of claim 15 wherein:
the computing service is configured to receive one or more user input;

monitoring the utilization level includes monitoring for one or more user input of the computing service from the user via the computer network;

determining whether the utilization level of the user with the automatically subscribed computing service is below the preset threshold includes determining whether at least one user input related to the computing service has been received in a predetermined period of time; and automatically unsubscribing includes in response to determining that at least one user input related to the computing service has not been received in a predetermined period of time, automatically unsubscribing, by the server, the user from the computing service.

19. The method of claim 15 wherein:

the computing service is configured to receive one or more user input;

monitoring the utilization level includes monitoring for one or more user input of the computing service from the user via the computer network;

determining whether the utilization level of the user with the automatically subscribed computing service is below the preset threshold includes determining whether a preset number of user input related to the computing service has been received in a predetermined period of time; and automatically unsubscribing includes in response to determining that a preset number of user input related to the computing service has not been received in a predetermined period of time, automatically unsubscribing, by the server, the user from the computing service.

20. The method of claim 15, further comprising, in response to determining that the utilization level of the user is not below the preset threshold, continuing the automatic subscription of the user to the computing service.

* * * * *